(12) United States Patent
Noda et al.

(10) Patent No.: US 7,643,963 B2
(45) Date of Patent: Jan. 5, 2010

(54) APPARATUS, METHOD AND PROGRAM FOR MEASURING SURFACE TEXTURE

(75) Inventors: Takashi Noda, Utsunomiya (JP);
Hiromi Deguchi, Utsunomiya (JP);
Naoya Kikuchi, Utsunomiya (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 12/055,547

(22) Filed: Mar. 26, 2008

(65) Prior Publication Data

US 2008/0236260 A1 Oct. 2, 2008

(30) Foreign Application Priority Data

Mar. 27, 2007 (JP) ............................. 2007-081396

(51) Int. Cl.
*G01B 5/20* (2006.01)
*G01B 5/28* (2006.01)
(52) U.S. Cl. ........................................ 702/168; 73/105
(58) Field of Classification Search .................. 702/35, 702/95, 150–153, 168; 73/105
See application file for complete search history.

(56) References Cited

U.S. PATENT DOCUMENTS 6,125,337 A * 9/2000 Rosenberg et al. .......... 702/153

2003/0089162 A1 * 5/2003 Samsavar et al. ............. 73/105

FOREIGN PATENT DOCUMENTS

| EP | 0 780 745 | 6/1997 |
| JP | 7-035534 | 2/1995 |
| JP | 08-178646 | 7/1996 |
| WO | 2006/115923 | 11/2006 |

* cited by examiner

*Primary Examiner*—Bryan Bui
(74) *Attorney, Agent, or Firm*—Rankin, Hill & Clark LLP (57) ABSTRACT

An apparatus for measuring surface texture causes a probe to trace a surface of a workpiece to detect contact between a tip provided on the tip of the probe and the surface of the workpiece and measures surface texture of the workpiece. The apparatus for measuring surface texture includes: a path division unit dividing a path along which the tip is moved into a plurality of sections between the starting point and the ending point of the path; a moving velocity calculation unit calculating a moving velocity of the tip in sequence from the starting point to the ending point for each of the plurality of sections, based on the path information for each of the plurality of sections; and a stylus movement control unit moving the tip in a section for which a moving velocity has been calculated at the moving velocity calculation unit.

15 Claims, 7 Drawing Sheets

APPARATUS, METHOD AND PROGRAM FOR MEASURING SURFACE TEXTURE

CROSS-REFERENCE TO RELATED APPLICATIONS

This application is based upon and claims the benefit of priority from the prior Japanese Patent Application No. 2007-081396, filed on Mar. 27, 2007, the entire contents of which are incorporated herein by reference.

BACKGROUND OF THE INVENTION

1. Field of the Invention

The present invention relates to an apparatus for measuring surface texture, such as a Coordinate Measuring Machine for measuring displacement with a tip, as well as a method and program for measuring surface texture.

2. Description of the Related Art

Conventionally, apparatuses for measuring surface texture are known to be arranged to scan a tip on a surface of a workpiece to measure surface texture of the workpiece based on contact of the tip with the surface of the workpiece (see, for example, Japanese Patent Laid-Open No. 8-178646). The apparatuses for measuring surface texture include, for example, a Coordinate Measuring Machine and a two-dimensional measuring instrument.

Generally, conventional apparatuses for measuring surface texture perform, so-called, "scanning measurement" where a path to be scanned is determined in advance for measurement. For example, such paths used in the scanning measurement include those figures including a single straight line, circle, circular arc, or continuous lines and circular arcs. Besides, the scanning measurement may be performed to any circles or circular arcs mentioned above as long as the workpiece may be approximated in a circular manner within a range where the tip can be displaced, even if they are not completely round in shape.

However, when the above-mentioned line and circle are used in the scanning measurement, such schemes are employed in determination of scanning velocity of the tip beginning at the end of a path for scanning to trace the path, provided that the scheme stops at the end of the path. This means that it is necessary to process information for all paths at a time. Therefore, it is not possible to initiate measurement during the process, which could take a large amount of time for measurement.

The present invention has been made in view of the above problems. An object of the invention is to provide an apparatus, method and program for measuring surface texture that may achieve faster measurement.

SUMMARY OF THE INVENTION

The present invention provides an apparatus for measuring surface texture operative to cause a probe to trace a surface of a workpiece to detect contact between a tip of the probe and the surface of the workpiece and measure surface texture of the workpiece, the apparatus comprising: a path division unit dividing a path along which the tip is moved into a plurality of sections between the starting point and the ending point of the path; a moving velocity calculation unit calculating a moving velocity of the tip in sequence from the starting point to the ending point for each of the plurality of sections, based on the path information for each of the plurality of sections; and a tip movement control unit moving the tip in a section for which a moving velocity has been calculated at the moving velocity calculation unit.

In addition, a part or whole of the path may be configured with free-form curves.

The moving velocity calculation unit may be configured to determine, before the tip completes its movement in a first section of the sections where the tip is being moved, whether calculation of a moving velocity shall be finished for a second section subsequent to the first section, wherein, when it is determined that the calculation shall be finished in time, then a moving velocity at the starting point of the second section is calculated to be equal to a moving velocity at the ending point of the first section, whereas when it is determined that the calculation shall not be finished in time, then a moving velocity at the ending point of the first section is modified to 0 and a moving velocity at the starting point of the second section is calculated as 0.

The moving velocity calculation unit may be configured to capture all information on groups of sections with the plurality of sections as a unit to calculate a moving velocity.

The moving velocity calculation unit may be configured to determine, before the tip moves to the last section included in a first group of sections where the tip is being moved, the first group of sections being among the groups of sections, whether calculation of a moving velocity shall be finished for a second group of sections preceding the first group of sections, and wherein, when it is determined that the calculation shall be finished in time, then a moving velocity at the starting point of the initial section in the second group of sections is calculated to be equal to a moving velocity at the ending point of the last section of the first group of sections, whereas when it is determined that the calculation shall not be finished in time, then a moving velocity of the last section of the first group of sections is modified so that a moving velocity at the ending point of the first group of sections becomes 0 and a moving velocity at the starting point of the second group of sections is calculated as 0.

The moving velocity calculation unit may be configured to calculate a moving velocity based on a curvature of the path information.

In addition, the present invention provides a method for measuring surface texture, using a computer, for causing a probe to trace a surface of a workpiece to detect contact between a tip provided on the tip of the probe and the surface of the workpiece and measuring surface texture of the workpiece, the method comprising: dividing a path along which the tip is moved into a plurality of sections between the starting point and the ending point of the path; calculating a moving velocity of the tip in sequence from the starting point to the ending point for each of the plurality of sections, based on the path information for each of the plurality of sections; and moving the tip in a section for which a moving velocity has been calculated at the step of calculating a moving velocity.

Further, the present invention provides a program for measuring surface texture to causing a probe to trace a surface of a workpiece to detect contact between a provided on the tip of the probe and the surface of the workpiece and measuring surface texture of the workpiece, the program causing a computer to perform the following steps of: dividing a path along which the tip is moved into a plurality of sections between the starting point and the ending point of the path; calculating a moving velocity of the tip in sequence from the starting point to the ending point for each of the plurality of sections, based on the path information for each of the plurality of sections;

and moving the tip in a section for which a moving velocity has been calculated at the step of calculating a moving velocity.

BRIEF DESCRIPTION OF THE DRAWINGS

FIG. 4 is a diagram illustrating a converting operation from a NURBS curve to a PCC curve at a path-information conversion unit 51a;

DETAILED DESCRIPTION OF THE EMBODIMENTS

One embodiment of the present invention will now be described below based on the accompanying drawings.

Figure 1:
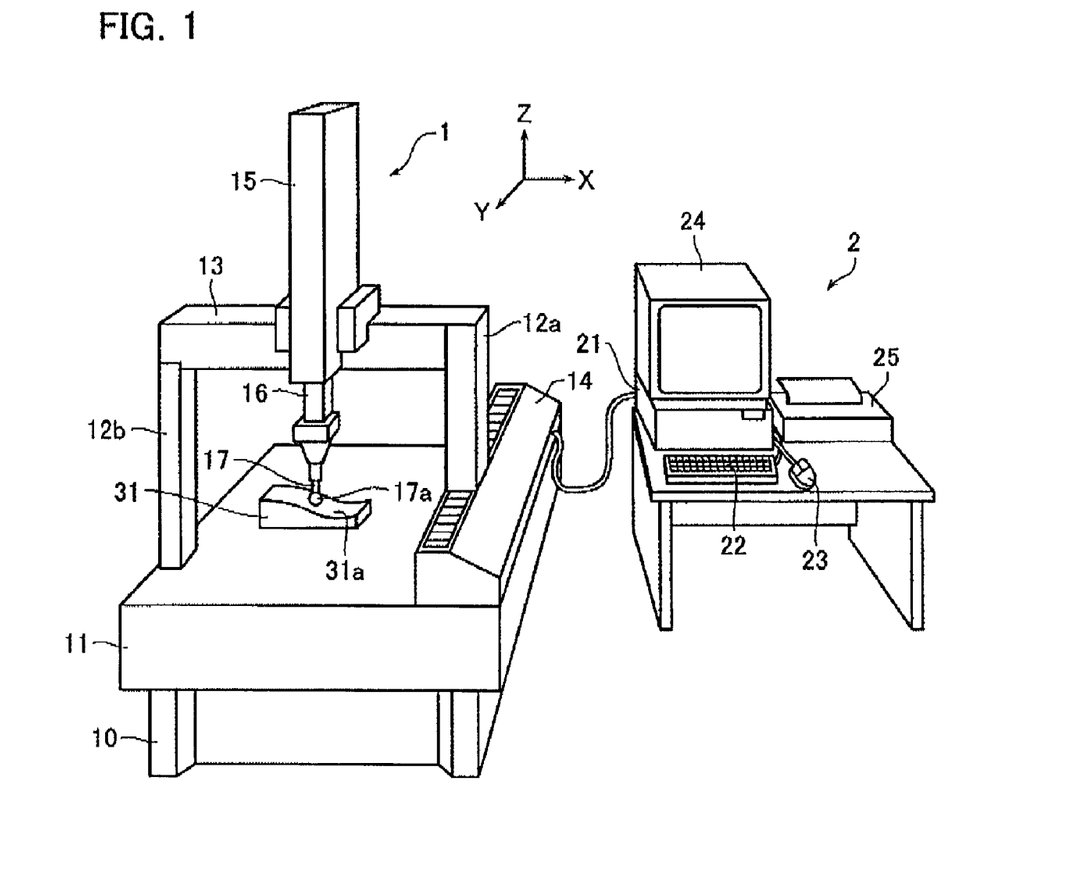
FIG. 1 is an external perspective view illustrating a configuration of an apparatus for measuring surface texture according to one embodiment of the present invention.

FIG. 1 is a perspective view illustrating a schematic configuration of an apparatus for measuring surface texture according to one embodiment of the present invention. The apparatus for measuring surface texture comprises a Coordinate Measuring Machine 1 and a computer 2. The computer 2 captures a necessary measurement value by driving and controlling the Coordinate Measuring Machine 1 and executes necessary arithmetic operations for geometric modeling.

The Coordinate Measuring Machine 1 is configured as illustrated in, e.g., FIG. 1. A surface plate 11 is mounted to be coincident with a horizontal plane on a vibration isolating stand 10 with the upper surface of the vibration isolating stand 10 as its base surface. The surface plate 11 has beam support members 12a and 12b provided to stand upright on opposite sides thereof. The upper ends of the beam support members 12a and 12b support a beam 13 that extends in the x-axis direction. The beam support member 12a has its lower end driven in the y-axis direction by a y-axis driving mechanism 14. In addition, the beam support member 12b has its lower end supported on the surface plate 11 by an air bearing so as to be movable in the y-axis direction. The beam 13 supports a column 15 that extends in the vertical direction (z-axis direction). The column 15 is driven in the x-axis direction along the beam 13. The column 15 is provided with a spindle 16 that is driven in the z-axis direction along the column 15. Attached to the lower end of the spindle 16 is a touch probe 17. In addition, a tip 17a of any shape, e.g., sphere shape, is formed provided on the tip of the probe 17. A contact signal is output when the tip 17a contacts a work piece surface 31a of a work piece 31 mounted on the surface plate 11. The computer 2 captures current XYZ coordinates of the reference position of the tip 17a.

The computer 2 comprises a computer body 21, a keyboard 22, a mouse 23, a CRT 24, and a printer 25.

Figure 2:
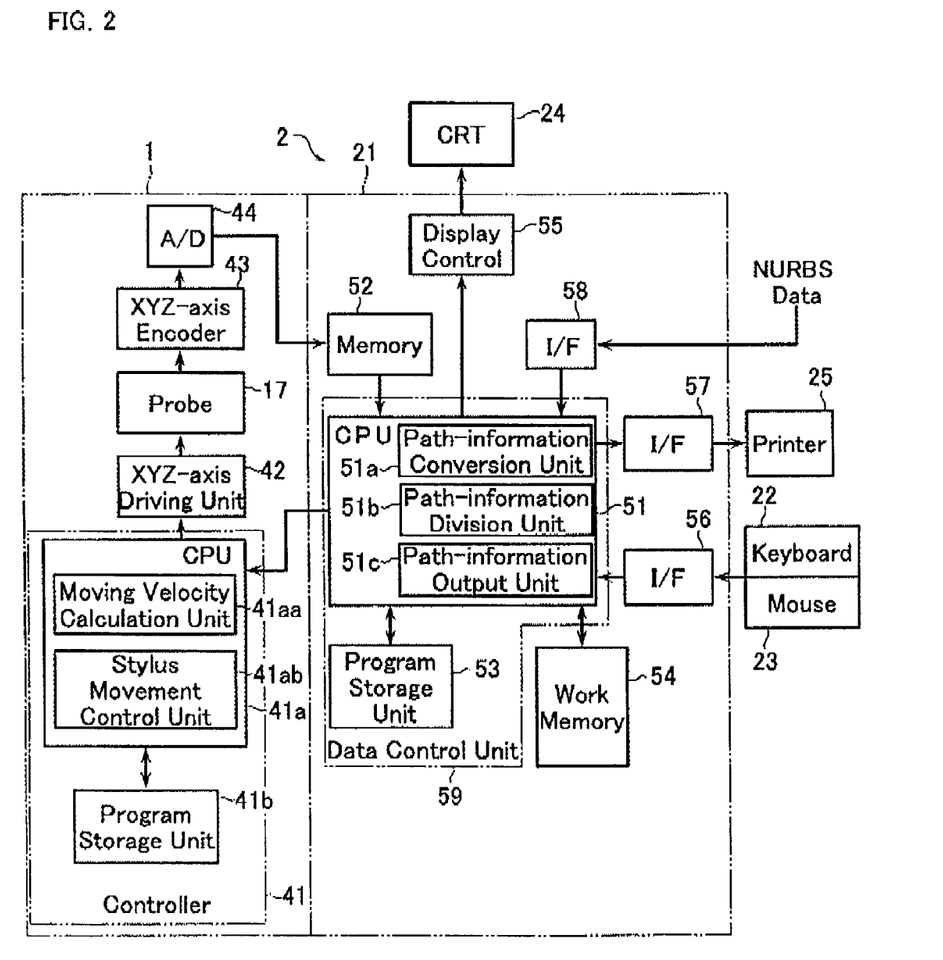
FIG. 2 is a functional block diagram of a Coordinate Measuring Machine 1 and a computer 2 of the same apparatus.

FIG. 2 is a block diagram of the entire apparatus, illustrating each configuration of a Coordinate Measuring Machine 1 and a computer 2.

As illustrated in FIG. 2, the Coordinate Measuring Machine 1 comprises a controller 41, a probe 17, a XYZ-axis driving unit 42 for driving the probe 17, a XYZ-axis encoder 43 for detecting signals based on contact of the tip 17a provided on the tip of the probe 17, and an A/D converter 44. Contact signals based on contact of the tip 17a with the work piece 31 are provided via the A/D converter 44 to the computer body 21 and temporarily stored in a memory 52.

The controller 41 includes a CPU (Central Processing Unit) 41a for controlling the XYZ-axis driving unit 42 and a program storage unit 41b. The program storage unit 41b, which is, e.g., a HDD (Hard Disk Drive), has functionality for storing program used in three-dimensional measurement. The CPU 41a reads program from the program storage unit 41b to control the XYZ-axis driving unit 42. The CPU 41a executes the read program and serves as a moving velocity calculation unit 41aa and a stylus movement control unit 41ab.

The moving velocity calculation unit 41aa has functionality for calculating a moving velocity of the tip 17a in sequence, beginning at the starting point for each of a plurality of sections, based on the path information received from the computer 2 (e.g., a group of divided PCC curves described below). The stylus movement control unit 41ab has functionality for moving the tip 17a at a calculated moving velocity in a section for which the corresponding moving velocity has already been calculated at the moving velocity calculation unit 41aa.

The computer body 21 includes a CPU 51 that has a primary role in control, the memory 52 connected to the CPU 51, a program storage unit 53, a work memory 54, a display control unit 55 for displaying measured data, execution part program to be executed, etc., to the CRT 24, and interfaces (I/F) 56 through 58.

The CPU 51 receives information of operator's instruction (input information) via the interface 56 that is input from the keyboard 22 and the mouse 23. In addition, the CPU 51 receives XYZ coordinates (input information) via the memory 52 that are detected at the XYZ-axis encoder 43 and converted to digital data at the A/D converter 44. Based on the input information, operator's instruction and program stored in the program storage unit 53, the CPU 51 performs operations, such as moving the stage with the XYZ-axis driving unit 42, analyzing measured values of the work piece 31, and so on.

In addition, the CPU 51 serves as either a path-information conversion unit 51a, a path-information division unit 51b, or a path-information output unit 51c depending on the read program.

The path-information conversion unit 51a has functionality for converting design values for the work piece 31

(NURBS (Non-Uniform Rational B-Spline) data) that are received from an external CAD system (not illustrated) via the interface 58 to path information such as a group of PCC (Parametric Cubic Curves) curves. The path-information division unit 51b has functionality for generating a group of divided PCC curves where a group of PCC curves is divided into a plurality of sections. The path-information output unit 51c has functionality for outputting a group of divided PCC curves to the controller 41.

The "program" stored in the program storage unit 53 refers to part program by which path information corresponding to the measured path of the work piece 31 is programmed, as well as other program that implements the path-information conversion unit 51a, the path-information division unit 51b, and the path-information output unit 51c etc.

The above-mentioned CPU 51 and program storage unit 53 together serves as a data control unit 59 for outputting the divided path information that is generated by dividing the path information based on data of the design values into a plurality of sections to the controller 41.

The work memory 54 provides a work area used by the CPU 51 to perform various operations. The printer 25 is provided to print out the results of measurement performed by the Coordinate Measuring Machine 1 via the interface 57.

Figure 3:
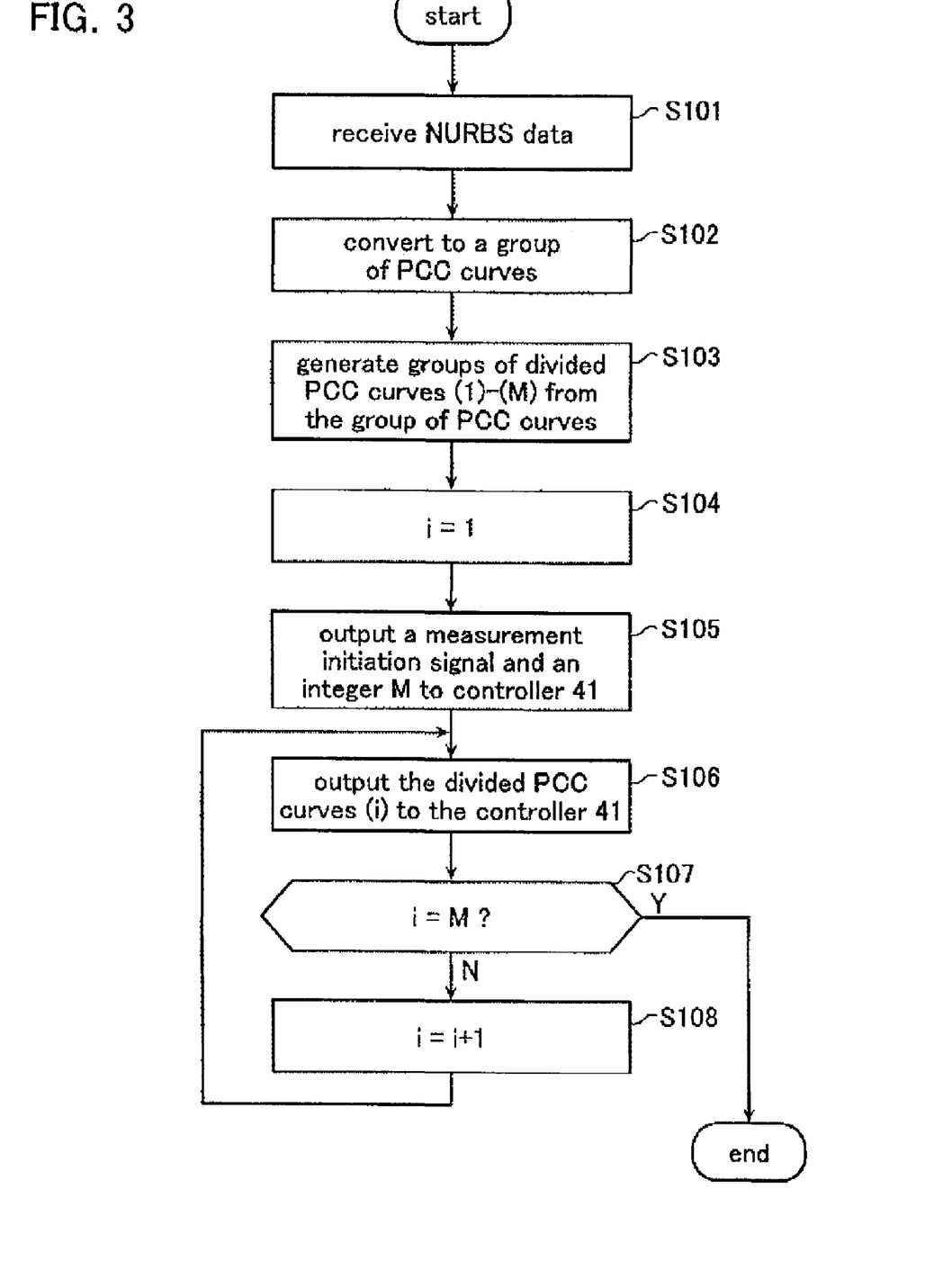
FIG. 3 is a flowchart illustrating a data control operation at a data control unit 59.

Referring now to a flowchart of FIG. 3, a data control operation at the data control unit 59 will be described below.

Firstly, the path-information conversion unit 51a receives data, such as NURBS data in which corresponding path information is written, from the external CAD system (not illustrated) (step S101). Secondly, the path-information conversion unit 51a converts the received NURBS data to a group of PCC curves (step S102).

Figure 4:
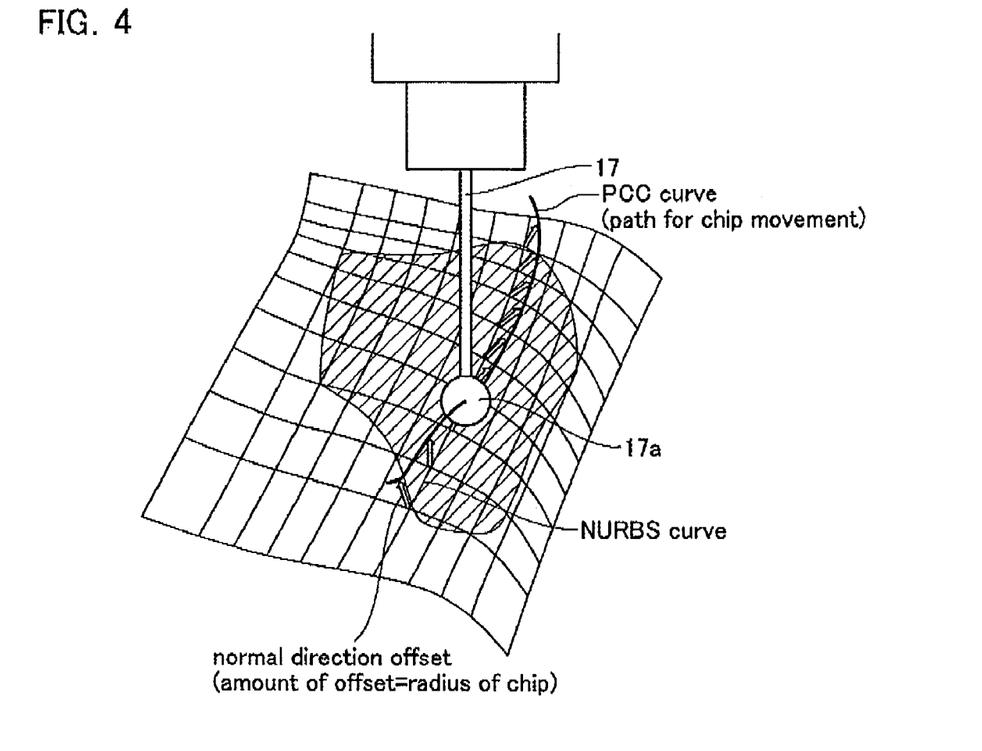

Conversion to a group of PCC curves will be generally described below with reference to FIGS. 4 and 5. As illustrated in FIG. 4, the shape of the work piece 31 may be represented by a NURBS curve line and a NURBS curved surface based on NURBS data having coordinates and parameters of the control point. Further, as even straight lines or planes can be represented by such NURBS data, the entire shape of the work piece 31 may be generally represented by the NURBS data. Therefore, the path information related to the movement of the tip 17a, including curved lines, circular arcs and straight lines, may be generally represented by NURBS data, based on which a PCC curve can be generated. A group of PCC curves for path information corresponds to a NURBS curve with offset in its normal direction. Wherein, the amount of offset is the radius of the tip 17a. The CPU41 controls the tip 17a in such a way that the center of the spherical tip 17a passes on the group of PCC curves.

Figure 5:
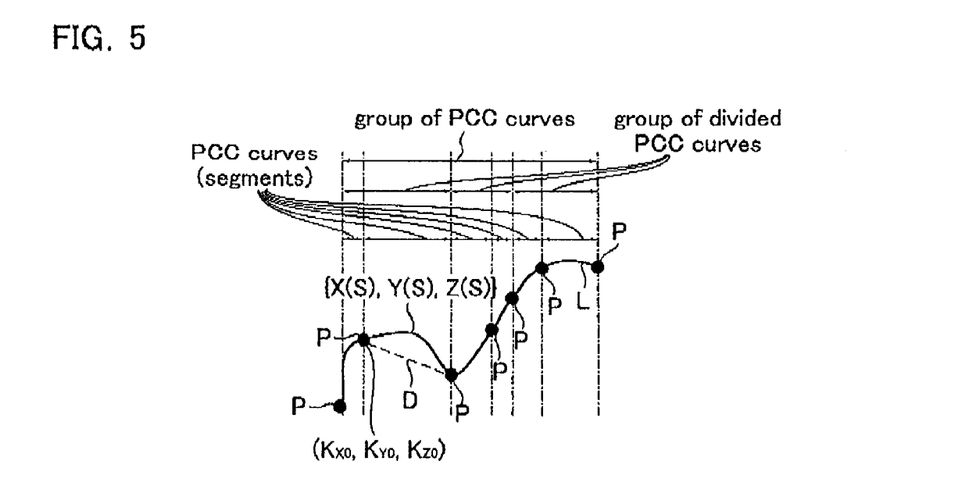
FIG. 5 is a conceptual diagram illustrating a group of PCC curves.

As illustrated in FIG. 5, a group of PCC curves corresponds to a respective segment of curve L that is divided by a plurality of points P. Each segment forms one PCC curve and a set of these segments (PCC curves) forms a group of PCC curves. In addition, a group of PCC curves is divided into multiple sets of PCC curves, which is called a "group of divided PCC curves". The group of PCC curves includes a plurality of PCC curves. With respect to the group of PCC curves, the ending point of the previous segment (PCC curve) corresponds to the starting point of the next segment (PCC curve). In this case, let $(K_{X0}, K_{Y0}, K_{Z0})$ be the coordinates of the starting point of any one of the PCC curves and let D be the length of a line between the starting point and the ending point of that PCC curve. Defined in this way, coordinates $\{X(S), Y(S), Z(S)\}$ of any point in the PCC curve are represented by the following formula (1):

$$X(S)=K_{X3}*S^3+K_{X2}*S^2+K_{X1}*S+K_{X0}$$

$$X(S)=K_{Y3}*S^3+K_{Y2}*S^2+K_{Y1}*S+K_{Y0}$$

$$X(S)=K_{Z3}*S^3+K_{Z2}*S^2+K_{Z1}*S+K_{Z0} \quad \text{Formula (1)}$$

Wherein, $S\{0, D\}$ and $K_{X3\text{-}X1}$, $K_{Y3\text{-}Y1}$, $K_{Z3\text{-}Z1}$ are constants.

Figure 6:
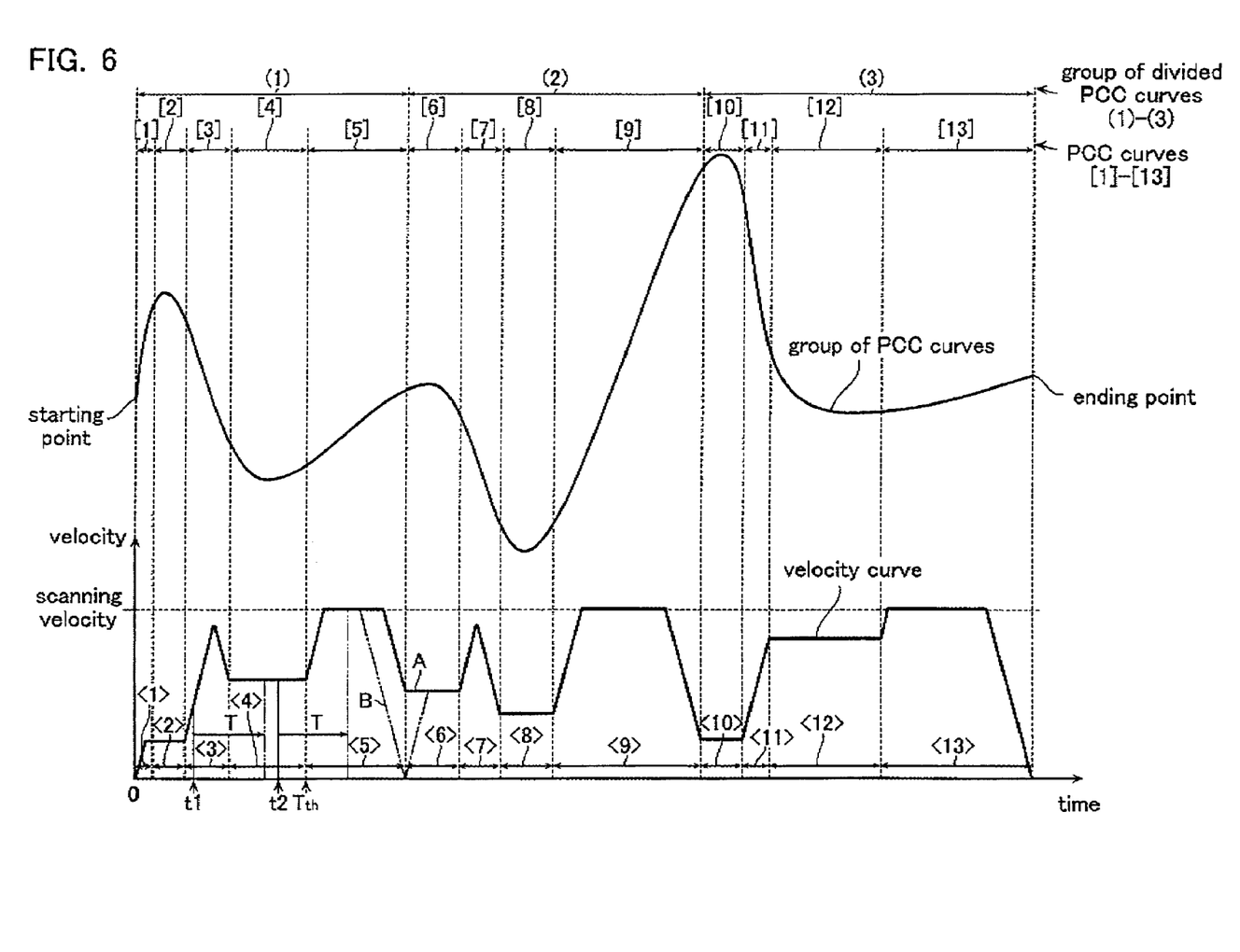
FIG. 6 is a diagram illustrating a group of PCC curves and a velocity curve.

At step S102, each PCC curve is generated in such a way that a representative curvature thereof will be substantially uniform. That is, as principle conditions, those portions with almost straight-line shape are assigned with a single PCC curve as much as possible and circular arc portions with a small curvature are also assigned with a single PCC curve as much as possible. The group of PCC curves generated under these conditions is as illustrated in FIG. 6. FIG. 6 illustrates a correspondence between a group of PCC curves and a velocity curve described below. FIG. 6 also illustrates the group of PCC curves with the starting point and the ending point specified therein. Each reference numeral [1]-[13] denotes one PCC curve of the group of PCC curves. Each reference numeral <1>-<13> denotes one velocity curve calculated for each PCC curve [1]-[13].

Referring again to FIG. 3, a data control operation at the data control unit 59 will be described below. The path-information conversion unit 51a converts NURBS data to a group of PCC curves that corresponds to a set of PCC curves (step S102), and the path-information division unit 51b divides the group of PCC curves to generate each group of divided PCC curves (1)-(M) (step S103). Each group of divided PCC curves (i) (i=1 to M) corresponds to multiple (M) groups of PCC curves resulting from division of a group of PCC curves in view of a buffer capacity R described below, and includes a plurality of PCC curves.

Then, the path-information output unit 51c initializes the setting so that the first group of divided PCC curves (1) can be selected (step S104). Subsequently, the path-information output unit 51c outputs a measurement initiation signal for initiating measurement and an integer M (the total number of groups of divided PCC curves) to the controller 41 (step S105).

Then, the path-information output unit 51c outputs the set group of divided PCC curves (i) to the controller 41 (step S106). Subsequently, the path-information output unit 51c determines whether i=M (step S107). At this moment, if it is determined that i≠M ("N" branch at step S107), then the path-information output unit 51c adds 1 to i (i=i+1) (step S108) and again carries out the operation of step S106. Alternatively, if it is determined that i=M ("Y" branch at step S107), then the path-information output unit 51c terminates the above operation.

The following description is made in detail with regard to an operation for dividing the above-mentioned group of PCC curves to generate each group of divided PCC curves (1)-(M) (step S103). In the operation for dividing the group of PCC curves (step S103), let E be the data capacity of entire PCC curves (the group of PCC curves) and let R be the buffer capacity for receiving commands of the controller 41, then the path-information division unit 51b calculates E/R (decimals rounded up to the nearest integer). For example, in the case of FIG. 6, a group of PCC curves includes thirteen PCC curves [1]-[13], E=13. In this case, if R=5, then M=3. Thus, the path-information division unit 51b divides a group of PCC curves in such a way that the group of PCC curves includes as equal number of PCC curves as possible, and it generates M groups of divided PCC curves (i) (i=1 to M). In the case of FIG. 6, a group of PCC curves is divided into the following three groups of divided PCC curves (1)-(3):

the group of divided PCC curves (1)=PCC curve [1]+PCC curve [2]=PCC curve [3]+PCC curve [4]+PCC curve [5]

the group of divided PCC curves (2)=PCC curve [6]+PCC curve [7]+PCC curve [8]+PCC curve [9]

the group of divided PCC curves (3)=PCC curve [10]+PCC curve [11]+PCC curve [12]+PCC curve [13]

Besides, the path-information division unit 51*b* sets the total number of PCC curves included in the first group of divided PCC curves (1) to be larger than those in the other groups of divided PCC curves (2) and (3).

Figure 7:
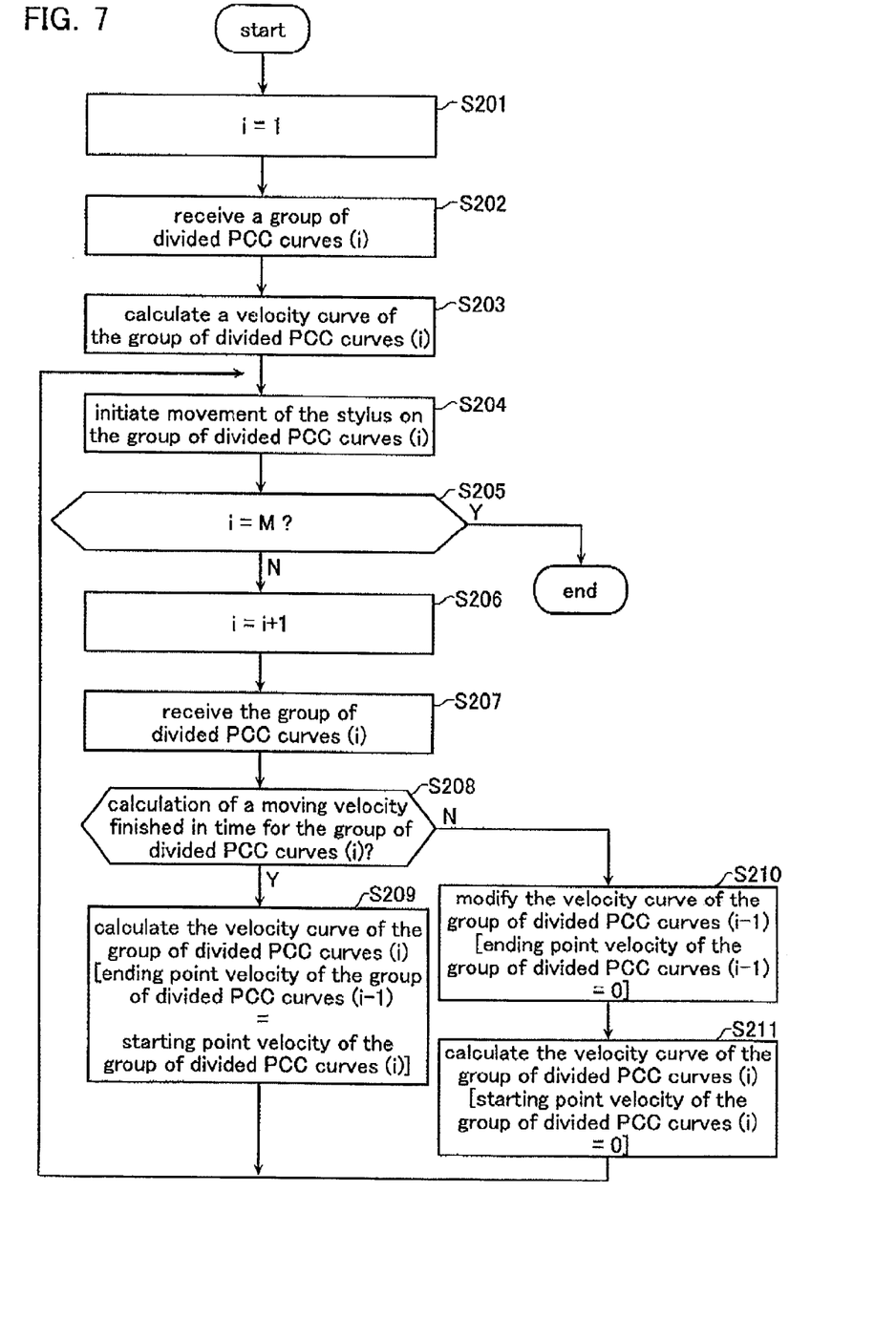
FIG. 7 is a flowchart of an operation for determining a moving velocity of a tip at a controller 41.
Figure 8A:
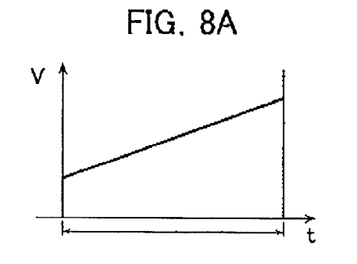
FIG. 8A is a diagram illustrating an exemplary velocity pattern.
Figure 8B:
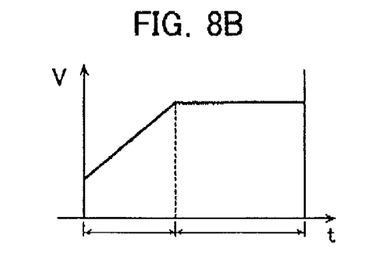
FIG. 8B is a diagram illustrating an exemplary velocity pattern.
Figure 8C:
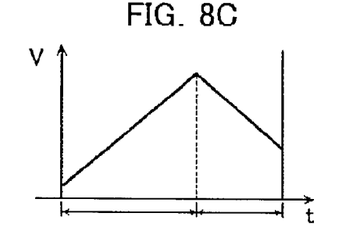
FIG. 8C is a diagram illustrating an exemplary velocity pattern.
Figure 8D:
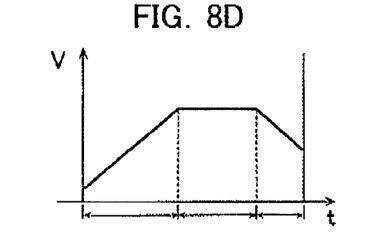
FIG. 8D is a diagram illustrating an exemplary velocity pattern.
Figure 8E:
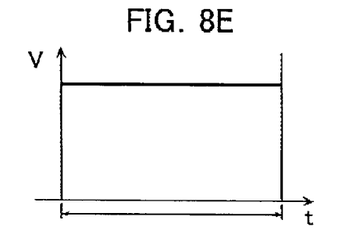
FIG. 8E is a diagram illustrating an exemplary velocity pattern.
Figure 8F:
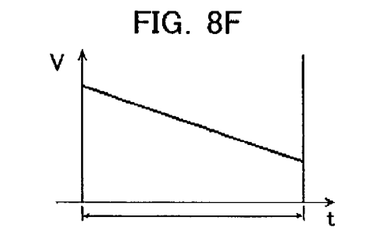
FIG. 8F is a diagram illustrating an exemplary velocity pattern.
Figure 8G:
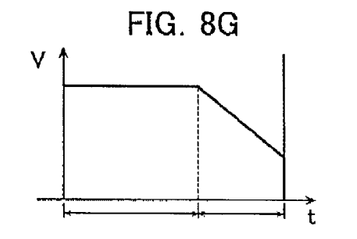
FIG. 8G is a diagram illustrating an exemplary velocity pattern.
Figure 8H:
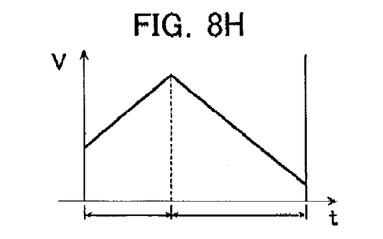
FIG. 8H is a diagram illustrating an exemplary velocity pattern.
Figure 8I:
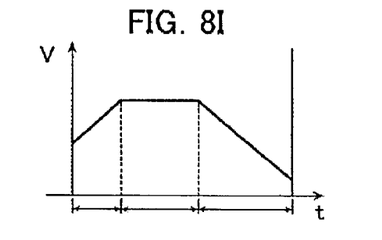
FIG. 8I is a diagram illustrating an exemplary velocity pattern.

Referring now to FIG. 7, an operation for determining a moving velocity of the tip 17*a* at the controller 41 is illustrated.

Firstly, the moving velocity calculation unit 41*aa* sets "i=1" as an initial setting (step S201). Secondly, the moving velocity calculation unit 41*aa* receives a group of divided PCC curves (i) from the data control unit 59 (the path-information output unit 51*c*) (step S202). Subsequently, the moving velocity calculation unit 41*aa* calculates a velocity curve of the group of divided PCC curves (i) (step S203).

Then, the stylus movement control unit 41*ab* moves the tip 17*a* on the group of divided PCC curves (i) along the calculated velocity curve (step S204).

Then, the moving velocity calculation unit 41*aa* determines whether i=M (step S205). At this moment, if it is determined that i=M ("Y" branch at step S205), then the moving velocity calculation unit 41*aa* terminates the operation for determining a moving velocity.

Alternatively, if it is determined that i≠M ("N" branch at step S205), then the moving velocity calculation unit 41*aa* adds 1 to i (i=i+1), turns to a state where it can receive the next group of divided PCC curves (i) (step S206), and receives the group of divided PCC curves (i) (step S207). For example, it receives the group of divided PCC curves (2) when the tip 17*a* is moved along the group of divided PCC curves (1).

Then, the moving velocity calculation unit 41*aa* determines (step S208) whether the following time of day exceeds a predetermined threshold time of day $T_{th}$ (t+T<$T_{th}$): a time of day "t" when the group of divided PCC curves (i) is received while the tip 17*a* is moved along the group of divided PCC curves (i−1) plus a time "T" necessary for calculation of a velocity curve of the group of divided PCC curves (i). This means that the moving velocity calculation unit 41*aa* determines at step S208 whether calculation of a moving velocity shall be finished for the group of divided PCC curves (i) subsequent to the group of divided PCC curves (i−1) before the tip 17*a* completes its movement along the group of divided PCC curves (i−1).

In this case, if it is determined that the calculation of the moving velocity for the group of divided PCC curves (i) shall be finished before the tip 17*a* completes its movement along the group of divided PCC curves (i−1) ("Y" branch at step S208), then the moving velocity calculation unit 41*aa* calculates the velocity curve of the group of divided PCC curves (i) (step S209). In this case, the velocity curve is calculated at step S209 in such a way that the velocity at the ending point of the group of divided PCC curves (i−1) is equal to the velocity at the starting point of the group of divided PCC curves (i). This means that the velocity is kept constant, and the operation proceeds to the next measurement.

Alternatively, if it is determined that the calculation of the moving velocity for the group of divided PCC curves (i) shall be not finished before the tip 17*a* completes its movement along the group of divided PCC curves (i−1) ("N" branch at step S208), then the moving velocity calculation unit 41*aa* modifies the velocity curve being measured for the group of divided PCC curves (i−1) in such a way that the velocity at the ending point of the group of divided PCC curves (i−1) becomes "0" (step S210). Thus, the moving velocity calculation unit 41*aa* calculates a velocity curve in such a way that the velocity at the starting point of the group of divided PCC curves (i) becomes "0" (step S211).

Then, when the operation of step S209 or step S211 is completed, the stylus movement control unit 41*ab* again carries out the operation of step S204.

Referring now to FIG. 6 and FIGS. 8A through 8I, the above-mentioned operation for calculating the velocity curve (step S203, S209, S211) will be specifically described below.

In FIG. 6, below the PCC curves [1]-[13], those velocity curves <1>-<13> (vertical axis: velocity/horizontal axis: time) are illustrated that are calculated based on these PCC curves [1]-[13]. Each of the velocity curves <1>-<13> is stored in the program storage unit 41*b*. Each of the velocity curves <1>-<13> is calculated based on velocity patterns as illustrated in FIGS. 8A through 8I. In each of FIGS. 8A through FIG. 8I, the vertical axis indicates velocity (V), while the horizontal axis indicates time (t). As illustrated in FIGS. 8A through 8I, a velocity pattern for increasing velocity, a velocity pattern for conserving velocity, and a velocity pattern for reducing velocity, as well as a combined velocity pattern of these are stored in the program storage unit 41*b*, respectively.

For example, before determining a velocity curve, the moving velocity calculation unit 41*aa* receives user inputs from the keyboard 22, etc., based on which it determines the maximum velocity. Then, the moving velocity calculation unit 41*aa* determines a velocity curve based on, e.g., the curvature of the PCC curves, so that the velocity curve becomes as close to the preset maximum velocity as possible. Besides, the moving velocity calculation unit 41*aa* calculates a velocity curve so that a continuous velocity may be obtained between the adjacent PCC curves.

In addition, if it is determined that the curvature of a curve is less than a predetermined value, then it is considered a straight line by the moving velocity calculation unfit 41*aa*.

Alternatively, if it is determined that the curvature is greater than the predetermined value, then the moving velocity calculation unit 41*aa* provides a maximum velocity in view of the machine's tolerance to acceleration and orbit errors.

Referring now to FIG. 6, the determination operations for the velocity curves (steps S208-S211) will be specifically described below based on the time when a group of divided PCC curves (i) is received. As illustrated in FIG. 6, with respect to the group of divided PCC curves (1), it is assumed that the threshold time of day $T_{th}$ used in the determination of step S207 is a time of day when the measurement is initiated for the last PCC curve [5] included in the group of divided PCC curves (1). It is also assumed that the time T for calculating a velocity curve of the group of divided PCC curves (2) is substantially equal to the measurement time for the PCC curve [4].

In this case, if the group of divided PCC curves (2) is received at a time of day t1 when the PCC curve [3] is measured, then a time of day when the calculation of the velocity curve is completed for the group of divided PCC curves (2) is equal to a time of day, t1+T (t1+T<$T_{th}$). This means that the calculation of the velocity curve shall be finished for the group of divided PCC curves (2) before the threshold time of day $T_{th}$. Consequently, measurement is performed based on the predetermined velocity curve using a velocity curve on the continuous line illustrated in FIG. 6 (labeled A), so that continuity of velocity can be satisfied on the next group of divided PCC curves (2).

On the other hand, if the group of divided PCC curves (2) is received at a time of day t2 when the PCC curve [4] is measured, then a time of day when the calculation of the velocity curve is completed for the group of divided PCC curves (2) is a time of day, t2+T (t2+T≧$T_{th}$). This means that the calculation of the velocity curve shall not be finished in time for the group of divided PCC curves (2) before the threshold time of day $T_{th}$. Consequently, measurement is performed with the velocity curve (labeled A) modified accordingly that has already been determined at the last PCC curve [5] included in the group of divided PCC curves (1), so that the velocity at the ending point of the group of divided PCC curves (1) becomes "0". Besides, the modified velocity curve is illustrated as dashed-two dotted line (labeled B) in FIG. 6. Further, in this case, the starting point moving velocity of the first PCC curve [6] included in the group of divided PCC curves (2) becomes "0".

As described above, in one embodiment of the present invention, a group of PCC curves is divided to generate a group of divided PCC curves. Then, measurement is performed for each group of divided PCC curves for which the velocity curve has been calculated. This means that the measurement and the calculation of velocity curves may be performed in parallel, thereby reducing the measurement time.

Although the present invention has been described with reference to embodiments thereof, the present invention is not limited to the embodiments illustrated and described herein. For example, in the above-described embodiments, although the moving velocity calculation unit 41aa is described in FIG. 6 to achieve linear acceleration and deceleration, the velocity may be accelerated or decelerated in "S-curve" patterns with respect to the time, instead of linear patterns, in view of smoothness of acceleration or deceleration.

What is claimed is:

1. An apparatus for measuring surface texture operative to cause a probe to trace a surface of a workpiece, to detect contact between a tip provided on the tip of the probe and the surface of the workpiece and measure surface texture of the workpiece, the apparatus comprising:
    a path division unit dividing a path along which the tip is moved into a plurality of sections between a starting point and an ending point of the path;
    a moving velocity calculation unit calculating a moving velocity of the tip in sequence from the starting point to the ending point for each of the plurality of sections, based on path information for each of the plurality of sections; and
    a stylus movement control unit moving the tip in a section for which a moving velocity has been calculated at the moving velocity calculation unit,
    wherein the moving velocity calculation unit determines, before the tip completes its movement in a first section of the sections where the tip is being moved, whether calculation of a moving velocity shall be finished for a second section subsequent to the first section, and wherein, when it is determined that the calculation shall be finished in time, then a moving velocity at the starting point of the second section is calculated to be equal to a moving velocity at the ending point of the first section, whereas when it is determined that the calculation shall not be finished in time, then a moving velocity at the ending point of the first section is modified to 0 and a moving velocity at the starting point of the second section is calculated as 0.

2. The apparatus for measuring surface texture according to claim 1, wherein
    a part or whole of the path is configured with free-form curves.

3. The apparatus for measuring surface texture according to claim 1, wherein
    the moving velocity calculation unit captures all information on groups of sections with the plurality of sections as a unit to calculate a moving velocity.

4. The apparatus for measuring surface texture according to claim 3, wherein
    the moving velocity calculation unit determines, before the tip moves to the last section included in a first group of sections where the tip is being moved, the first group of sections being among the groups of sections, whether calculation of a moving velocity shall be finished for a second group of sections subsequent to the first group of sections, and wherein, when it is determined that the calculation shall be finished in time, then a moving velocity at the starting point of the initial section in the second group of sections is calculated to be equal to a moving velocity at the ending point of the last section of the first group of sections, whereas when it is determined that the calculation shall not be finished in time, then a moving velocity of the last section of the first group of sections is modified so that a moving velocity at the ending point of the first group of sections becomes 0 and a moving velocity at the starting point of the second group of sections is calculated as 0.

5. The apparatus for measuring surface texture according to claim 1, wherein
    the moving velocity calculation unit calculates a moving velocity based on a curvature of the path information.

6. A method for measuring surface texture, using a computer, for causing a probe to trace a surface of a workpiece to detect contact between a tip provided on the tip of the probe and the surface of the workpiece and measuring surface texture of the workpiece, the method comprising the steps of:
    dividing a path along which the tip is moved into a plurality of sections between a starting point and an ending point of the path;
    calculating a moving velocity of the tip in sequence from the starting point to the ending point for each of the plurality of sections, based on path information for each of the plurality of sections; and
    moving the tip in a section for which a moving velocity has been calculated at the step of calculating a moving velocity,
    wherein at the step of calculating a moving velocity, a determination is made as to whether, before the tip completes its movement in a first section of the sections where the tip is being moved, calculation of a moving velocity shall be finished for a second section subsequent to the first section, and wherein, when it is determined that the calculation shall be finished in time, then a moving velocity at the starting point of the second section is calculated to be equal to a moving velocity at the ending point of the first section, whereas when it is determined that the calculation shall not be finished in time, then a moving velocity at the ending point of the first section is modified to 0 and a moving velocity at the starting point of the second section is calculated as 0.

7. The method for measuring surface texture according to claim 6, wherein
    a part or whole of the path is configured with free-form curves.

8. The method for measuring surface texture according to claim 6, wherein
    at the step of calculating a moving velocity, all information on groups of sections, with the plurality of sections as a unit, is captured to calculate a moving velocity.

9. The method for measuring surface texture according to claim 8, wherein at the step of calculating a moving velocity, a determination is made as to whether, before the tip moves to the last section included in a first group of sections where the tip is being moved, the first group of sections being among the groups of sections, calculation of a moving velocity shall be finished for a second group of sections subsequent to the first group of sections, and wherein, when it is determined that the calculation shall be finished in time, then a moving velocity at the starting point of the initial section in the second group of sections is calculated to be equal to a moving velocity at the ending point of the last section of the first group of sections, whereas when it is determined that the calculation shall not be finished in time, then a moving velocity of the last section of the first group of sections is modified so that a moving velocity at the ending point of the first group of sections becomes 0 and a moving velocity at the starting point of the second group of sections is calculated as 0.

10. The method for measuring surface texture according to claim 6, wherein at the step of calculating a moving velocity, a moving velocity is calculated based on a curvature of the path information.

11. A computer program stored on a storage medium for causing a computer to perform a method for measuring surface texture to causing a probe to trace a surface of a workpiece to detect contact between a tip provided on the tip of the probe and the surface of the workpiece and measuring surface texture of the workpiece, comprising the following steps of:

dividing a path along which the tip is moved into a plurality of sections between a starting point and an ending point of the path;

calculating a moving velocity of the tip in sequence from the starting point to the ending point for each of the plurality of sections, based on path information for each of the plurality of sections; and moving the tip in a section for which a moving velocity has been calculated at the step of calculating a moving velocity, wherein at the step of calculating a moving velocity, a determination is made as to whether, before the tip completes its movement in a first section of the sections where the tip is being moved, calculation of a moving velocity shall be finished for a second section subsequent to the first section, and wherein, when it is determined that the calculation shall be finished in time, then a moving velocity at the starting point of the second section is calculated to be equal to a moving velocity at the ending point of the first section, whereas when it is determined that the calculation shall not be finished in time, then a moving velocity at the ending point of the first section is modified to 0 and a moving velocity at the starting point of the second section is calculated as 0.

12. The computer program stored on a storage medium for causing a computer to perform a method for measuring surface texture according to claim 11, wherein a part or whole of the path is configured with free-form curves.

13. The computer program stored on a storage medium for causing a computer to perform a method for measuring surface texture according to claim 11, wherein at the step of calculating a moving velocity, all information on groups of sections, with the plurality of sections as a unit, is captured to calculate a moving velocity.

14. The computer program stored on a storage medium for causing a computer to perform a method for measuring surface texture according to claim 13, wherein at the step of calculating a moving velocity, a determination is made as to whether, before the tip moves to the last section included in a first group of sections where the tip is being moved, the first group of sections being among the groups of sections, calculation of a moving velocity shall be finished for a second group of sections subsequent to the first group of sections, and wherein, when it is determined that the calculation shall be finished in time, then a moving velocity at the starting point of the initial section in the second group of sections is calculated to be equal to a moving velocity at the ending point of the last section of the first group of sections, whereas when it is determined that the calculation shall not be finished in time, then a moving velocity of the last section of the first group of sections is modified so that a moving velocity at the ending point of the first group of sections becomes 0 and a moving velocity at the starting point of the second group of sections is calculated as 0.

15. The computer program stored on a storage medium for causing a computer to perform a method for measuring surface texture according to claim 11, wherein at the step of calculating a moving velocity, a moving velocity is calculated based on a curvature of the path information.

* * * * *